(12) United States Patent
Anghel et al.

(10) Patent No.: US 8,216,545 B2
(45) Date of Patent: Jul. 10, 2012

(54) DOPED HYDROGEN STORAGE MATERIAL

(75) Inventors: Alexandra Teodora Anghel, The Hague (NL); Brian Elliott Hayden, Hampshire (GB); Duncan Clifford Smith, Hampshire (GB); Jean-Philippe Soulie, Hampshire (GB)

(73) Assignee: Ilika Technologies Ltd, Southampton (GB)

( * ) Notice: Subject to any disclaimer, the term of this patent is extended or adjusted under 35 U.S.C. 154(b) by 0 days.

(21) Appl. No.: 12/866,051

(22) PCT Filed: Feb. 9, 2009

(86) PCT No.: PCT/EP2009/051436
§ 371 (c)(1),
(2), (4) Date: Nov. 10, 2010

(87) PCT Pub. No.: WO2009/101046
PCT Pub. Date: Aug. 20, 2009

(65) Prior Publication Data
US 2011/0044889 A1    Feb. 24, 2011

(30) Foreign Application Priority Data

Feb. 12, 2008   (EP) .................................. 08101517

(51) Int. Cl.
*C01B 6/10* (2006.01)
*C01B 3/08* (2006.01)
(52) U.S. Cl. .................. 423/644; 420/900; 423/286
(58) Field of Classification Search ............... 432/644, 432/647; 420/900; 423/286; 206/0.7
See application file for complete search history.

(56) References Cited

U.S. PATENT DOCUMENTS
6,106,801 A   8/2000   Bogdanovic et al.

FOREIGN PATENT DOCUMENTS
JP   2007-000856   1/2007
WO   2004/041717   5/2004
WO   2007/002039   1/2007

OTHER PUBLICATIONS

Li et al. "Effects of ball milling and additives on dehydriding behaviors of well-crystallized Mg(BH4)2", 2007, Scripta Materialia, 57, p. 679-682.*
Wang et al., "Hydride Development for Hydrogen Storage, DOE Hydrogen Storage", FY 2004 Progress Report, pp. 220-229.
Li et al., "Effects of ball milling and additives on dehydriding behaviors of well-crystallized Mg(GH$_4$)$_2$", Scripta Materialia 57, 2007, pp. 679-682.
Li et al., "Dehydriding and rehydriding processes of well-crystallized Mg(GH$_4$)$_2$ accompanying with formation of intermediate compounds", Acta Materialia 56, 2008, pp. 1342-1347.
Chlopek et al., "Synthesis and properties of magnesium tetrahydroborate, Mg(GH$_4$)$_2$", Journal of Materials Chemistry, Sep. 7, 2007, pp. 3496-3503.
Her et al., "Structure of unsolvated magnesium borohydride Mg(GH$_4$)$_2$", Acta Crystallographica Section B, Structural Science, 2007, pp. 561-568.
International Search Report for corresponding Application No. PCT/EP2009/051436 mailed May 20, 2009.
International Preliminary Report on Patentability dated Aug. 26, 2010.

* cited by examiner

*Primary Examiner* — Stuart Hendrickson
*Assistant Examiner* — Syed Iqbal
(74) *Attorney, Agent, or Firm* — Renner, Otto, Boisselle & Sklar, LLP

(57) ABSTRACT

The present invention relates to a doped hydrogen storage material according to the general formula:

$$Mg_xB_yM_zH_n$$

wherein: (i) the ratio of x/y is in the range of from 0.15 to 1.5; (ii) z is in the range of from 0.005 to 0.35; (iii) x+y+z equals 1; (iv) M=is one or more metals selected from the group of selected Sc, Ti, V, Cr, Mn, Fe, Co, Ni, Cu and Zn; (v) n is no more than 4y; and wherein x/y does not equal 0.5 and at least part of the doped hydrogen storage material is amorphous. The present invention further relates to the use of doped hydrogen storage materials according to the invention for storing hydrogen and a method for reversibly desorbing and/or absorbing hydrogen.

9 Claims, No Drawings

DOPED HYDROGEN STORAGE MATERIAL

This application is a national phase of International Application No. PCT/EP2009/051436 filed Feb. 9, 2009 and published in the English language.

FIELD OF THE INVENTION

The invention provides a doped hydrogen storage material, the use of such material for storing hydrogen and a method for reversibly desorbing and/or absorbing hydrogen using a doped hydrogen storage material according to the invention.

BACKGROUND OF THE INVENTION

The storage of hydrogen in the form of metal hydrides has gained a lot of attention in the recent years. The storage of hydrogen in metal hydrides is based on chemisorption, i.e. no molecular hydrogen ($H_2$) is stored but the hydrogen reacts with the metal to form metal hydrides. Storage of hydrogen in the from of metal hydrides has the advantage over storage of hydrogen in for instance liquid or compressed state in that it does not require the use of low temperatures or excessive pressures.

In U.S. Pat. No. 6,106,801 it is disclosed that Ti-doped $NaAlH_4$ compositions can be used to store hydrogen. U.S. Pat. No. 6,106,801 discloses that by doping $NaAlH_4$ with Ti the hydrogen desorption temperature decreases from approximately 200° C. to 140° C. However, Ti-doped $NaAlH_4$ may comprise hydrogen atoms up to a maximum hydrogen storage density per weight of storage material of approximately 5 wt %.

It has been proposed by Chlopek et al. (J. Mater. Chem., 2007, 17, 3496-3503) that a suitable alternative would be the use of magnesium tetrahydroborate, i.e. $Mg(BH_4)_2$. This hydride may comprise up to 14.9 wt % of hydrogen, based on the weight of the hydride. However, the onset temperature of hydrogen desorption is high, typically temperatures above 290° C. are required before hydrogen is released from the hydride.

Li et al. (Li et al., Dehydriding and rehydriding processes of well-crystallised $Mg(BH_4)_2$ accompanying with formation of intermediate products, Acta Mater (2008) doi10.1016/j.actamat. 2007.11.023) show that well-crystallized $Mg(BH_4)_2$ may be dehydrided. In a second step the dehydrided $Mg(BH_4)_2$ is rehydrided by subjecting the dehydrided well-crystallized $Mg(BH_4)_2$ to hydrogen at a temperature of 543 K and a pressure of 40 MPa for a time period of 48 hours. In a third, dehydriding, step, 6.1 mass % of hydrogen could be obtained from the material, which was rehydrided in the second step. Of the 6.1 mass %, 3.9 mass % was attributed to the formation of $MgH_2$ during rehydriding in the second step. Disadvantage of the process of Li et al. is that this only modest rehydriding takes place under severe pressure and temperature conditions for prolonged times. Furthermore, it is undesired to form $MgH_2$ during rehydriding. $MgH_2$ has a much lower hydrogen storage capacity than the well-crystallized $Mg(BH_4)_2$.

There is still a need in the art for a hydrogen storage material that allows a reversible storage of hydrogen at low hydrogen uptake and release temperatures and mild rehydriding conditions.

SUMMARY OF THE INVENTION

It has now been found that Mg and B comprising hydrogen storage materials doped with a transition material may be prepared, which may be reversibly dehydrided and rehydrided under mild rehydriding conditions.

Accordingly, the present invention provides a doped hydrogen storage material according to the general formula:

$$Mg_xB_yM_zH_n$$

wherein:
(i) the ratio of x/y is in the range of from 0.15 to 1.5;
(ii) z is in the range of from 0.005 to 0.35;
(iii) x+y+z equals 1;
(iv) M=is one or more metals selected from the group of selected Sc, Ti, V, Cr, Mn, Fe, Co, Ni, Cu and Zn;
(v) n is no more than 4y; and
wherein x/y does not equal 0.5 and at least part of the doped hydrogen storage material is amorphous.

Reference herein to doping is to the addition of an amount of another material.

The doped hydrogen storage material according to the invention shows an onset-temperature of hydrogen desorption of the corresponding hydrides which is significantly lowered compared to $Mg(BH_4)_2$.

Reference herein to the onset-temperature of hydrogen desorption is to the lowest temperature at which hydrogen desorption is observed. In a further aspect, the invention relates to the use of the doped hydrogen storage material according to the invention to store hydrogen.

In an even further aspect, the invention relates to a method for reversibly desorbing and/or absorbing hydrogen using a doped hydrogen storage material according to the invention, comprising:
a) dehydriding the doped hydrogen storage material by desorbing hydrogen from the doped hydrogen storage material to obtain hydrogen gas and a partially dehydrided doped hydrogen storage material, whereby the obtained partially dehydrided doped hydrogen storage material comprises at least 10 atomic %, in particular at least 30 atomic %, more in particular at least 50 atomic % of the maximum amount of atomic hydrogen which can be stored in the doped hydrogen storage material; and
b) hydriding the partially dehydrided doped hydrogen storage material by contacting the partially dehydrided doped hydrogen storage material with a hydrogen-comprising gas to reversibly store hydrogen and to obtain an at least partially rehydrided doped hydrogen storage material.

The doped hydrogen storage material according to the present invention provides high storage capacity for hydrogen while allowing to retrieve the hydrogen from the storage material relatively low temperatures.

Reference herein to dehydriding is to desorption of hydrogen from the hydrogen storage material. Reference to hydriding or rehydriding is to absorption of hydrogen in the hydrogen storage material.

DETAILED DESCRIPTION OF THE INVENTION

The present invention provides a doped hydrogen storage material comprising Mg and B and having the following general formula:

$$Mg_xB_yM_zH_n \qquad (1)$$

The doped hydrogen storage material according to the invention and represented by formula (1) comprises Mg and B in a molar ratio (x/y) of in the range of from 0.15 to 1.5, preferably of from 0.15 to 0.7, whereby the molar ratio of Mg and B is not 0.5. The preferred molar ratios of Mg and B provide the lowest hydrogen desorption onset-temperatures. More preferably, the doped hydrogen storage material according to the invention and represented by formula (1) comprises Mg and B in a molar ratio (x/y), which is equal to 0.48 or higher, even more preferably in the range of from 0.48 to 0.70, while the molar ratio of Mg and B (x/y) is not 0.5. Such molar ratios of Mg and B may provide high hydrogen storage capacity. Without wishing to be bound to a particular theory, it is presently believed that by providing a composition comprising Mg and B in a ratio other than the stoichiometric molar ratio of Mg and B, i.e. a molar ratio of Mg to B of 0.5, induces the formation of favourable compositions other than $Mg(BH_4)_2$. It is further believed that this effect is noticeable even when the deviation from the stoichiometric composition is small, for instance the molar ratio of Mg and B (x/y) is at least outside the range of from 0.49 to 0.51.

The doped hydrogen storage material according to the invention is at least partly amorphous or may be completely amorphous. Reference herein to amorphous is to a non-crystalline structure, i.e. at least part of the material has a non-crystalline structure. Preferably at least 5%, more preferably at least 50%, even more preferably at least 90%, still even more preferably 95% of the hydrogen storage material is amorphous. Reference herein to a non-crystalline structure is to a structure for which in an X-ray Diffraction (XRD) analysis no crystalline peaks can be identified. As described above and without wishing to be bound to a particular theory, it is presently believed that the amorphous or non-crystalline structure is preferred due to its improved diffusion properties compared to the crystalline material.

The doped hydrogen storage material according to the present invention comprise besides Mg and B, a metal dopant represented in formula (1) as M. M is one or more transition metals selected from the group of Sc, Ti, V, Cr, Mn, Fe, Co, Ni, Cu and Zn. It has been found that the metal dopant catalyses the (re)hydriding and dehydriding processes in the hydrogen storage material. In addition it was found that the dopant may induce a significant decrease of the hydrogen desorption temperature. Preferably, the dopant is Ti and/or Ni, whereby Ti is more preferred due to its lower atomic weight.

Typically, the hydrogen desorption properties of a doped hydrogen storage material do not depend on the amount of dopant added, provided a minimum amount of dopant is present. A factor limiting the amount of added dopant is the increased weight of the hydrogen storage material and resulting lower hydrogen storage density per weight of storage material.

The amount of dopant present in the composition according to formula (1) is given by z and z is in the range of from 0.005 to 0.35. It was found that in the case of the doped hydrogen storage material according to the present invention the hydrogen desorption behaviour, i.e. the hydrogen desorption temperature, may be optimized by choosing the amount of dopant in the doped hydrogen storage material. Such preferred amounts of dopant are obtained by providing a material having a composition according to formula (1) wherein z is preferably in the range of from 0.005 to 0.1, more preferably of from 0.02 to 0.07.

In formula (1), x may be in the range of from 0.2 to 0.6 and y may be in the range of from 0.4 to 0.85. Preferably, more than 50% of the metal atoms are B atoms, i.e. y>0.5, more preferably, y is in the range of from 0.5 to 0.85. Compositions comprising increased amounts of B may store higher quantities of hydrogen due to its higher hydrogen storage density per weight of storage material. In formula (1), the sum of x, y and z must be 1.

The hydrogen storage material according to formula (1) may also comprise hydrogen. It will be appreciated that the amount of hydrogen depends on whether the hydrogen storage material is fully hydrided or partially hydrided. The maximum amount of hydrogen that may be stored in the hydrogen storage material is related to the amount of B and to a lesser extent Mg present in the material and on the state of the hydrogen atoms in the hydrided material. Without wishing to be bound to a particular theory, it is presently believed that each B atom in the hydrogen storage material may bind up to 4 hydrogen atoms. Therefore n is in the range of from 0 to 4y. When n is 0, no hydrogen is present in the hydrogen storage material. Typically, n is 0 only for doped hydrogen storage materials as prepared in the absence of hydrogen. After the freshly made hydrogen-free doped hydrogen storage material is contacted with hydrogen for the first time, the material will always contain some hydrogen and n will not be 0.

It will be appreciated that trace amounts of other metal atoms may always be present in the doped hydrogen storage material according to the invention, however such trace amounts of other metals do not affect the hydrogen storage behaviour of the doped hydrogen storage material. Such traces of other metal atoms may be due to for instance impurities in the separate components or impurities introduced during the preparation of the doped hydrogen storage materials. Preferably, the Mg and B together with the dopant make up at least 99 atomic %, more preferably at least 99.99 atomic % of the metal atoms present in the doped hydrogen storage material. More preferably, the doped hydrogen storage material comprises no metal atoms other than Mg, B, Sc, Ti, V, Cr, Mn, Fe, Co, Ni, Cu and Zn.

The doped hydrogen storage material according to the invention may be prepared by intimately mixing metallic Mg and B or an inter-metallic compound of Mg and B with the dopant. Optionally, the Mg, B and/or the inter-metallic compound of Mg and B are in the form of the respective hydrides.

The dopant may be provided as a pure elemental metal. Preferably, the dopant is in the form of a dopant composition, wherein the dopant composition is an alcoholate, halide, hydride, organo-metallic or inter-metallic compound of one or more of the mentioned transition metals.

The components making up the doped hydrogen storage material may be intimately mixed in an inert atmosphere, i.e. in vacuum or in an atmosphere comprising no other reactive gaseous or vapour component other than hydrogen. For instance, to prevent oxidation of one or more of the components, the atmosphere should not comprise oxygen. Examples of suitable atmospheres are for example atmospheres comprising nitrogen, hydrogen, argon gas or mixtures thereof.

A suitable method for preparing the doped hydrogen storage materials according to the invention is the 'wedge' growth method as described in WO2005/035820, which is hereby incorporated by reference. In this method Mg, B and Ti are evaporated and deposited on a suitable substrate in an ultra high vacuum system, hydrides can be prepared in hydrogen comprising atmosphere. This method allows for the preparation of amorphous materials, whereas the method described in for instance the Li et al. reference, see hereinabove, produced well-crystallised $Mg(BH_4)_2$. Other suitable methods may include plasma arc methods.

The invention also relates to the use of a doped hydrogen storage material according to the invention to store hydrogen either reversibly or irreversibly.

A hydrogen-comprising gas may by obtained by desorbing, or withdrawing, hydrogen from an at least partially hydrided doped hydrogen storage material according to the invention. In addition a partially dehydrided doped hydrogen storage material is obtained. Depending on exact composition of the hydride and the desired equilibrium pressure, the at least partially hydrided material may be dehydrided by subjecting it to a sufficiently high temperature, preferably in the range of from 20 to 500° C., and a suitable pressure, preferably below the equilibrium pressure. It is an advantage of the present invention that hydrogen may be desorbed from the doped hydrogen storage material according the invention at significantly milder temperature conditions compared to non-doped Mg and B based hydrogen storage materials, such as $Mg(BH_4)_2$. Consequently, hydrogen may be obtained from the doped hydrogen storage material at lower temperatures.

It has, however, been found that in order to be able to reversibly dehydride and rehydride the doped hydrogen storage material according to the invention, a minimum amount of hydrogen must remain in the obtained partially dehydrided doped hydrogen storage material. The obtained partially dehydrided doped hydrogen storage material should still comprise at least 10 atomic %, in particular at least 20 atomic %, more in particular at least 30 atomic %, even more in particular at least 40 atomic %, still more in particular at least 50 atomic %, of the maximum amount of atomic hydrogen which can be stored in the doped hydrogen storage material. Reference herein to the maximum amount of hydrogen that can be stored in the doped hydrogen storage material is to an amount of 4 hydrogen atoms per boron atom (i.e. n=4y) present in the doped hydrogen storage material. Without wishing to be bound to a particular theory, it is presently believed that by limiting the amount of hydrogen removed from the doped hydrogen storage material, the formation of elemental Mg and B is, at least partly, prevented. It is believed that the intermediate products other than elemental Mg and B formed during dehydriding are susceptible to rehydriding.

Hydrogen is stored in the doped hydrogen storage material by contacting an at least partially dehydrided doped hydrogen storage material according to the invention to a hydrogen-comprising gas, preferably hydrogen gas, at an elevated pressure, preferably in the range of from 1 to 50 bar, more preferably in the range of from 5 to 15 bar. The temperature at which the doped hydrogen storage material is contacted with the hydrogen-comprising gas may be any suitable temperature, typically above 10° C., preferably in the range of from 10 to 150° C., more preferably in the range of from 15 to 50° C. Suitably, the doped hydrogen storage material is contacted with the hydrogen-comprising gas at ambient temperatures.

The doped hydrogen storage material is contacted with the hydrogen-comprising gas for any time necessary to sufficiently rehydride the at least partially dehydrided doped hydrogen storage material. Preferably, in the range of from 1 to 24 hours, more preferably 5 to 10 hours.

An at least partially rehydrided doped hydrogen storage material is obtained.

It is an advantage of the present invention that the doped hydrogen storage material according the invention may be hydrided or rehydrided at significantly milder conditions compared to, for instance, well-crystallized $Mg(BH_4)_2$ as disclosed in the Li et al. reference, see hereinabove. Li et al. rehydrided a dehydrided well-crystallised $Mg(BH_4)_2$ by contacting the dehydrided well-crystallised $Mg(BH_4)_2$ with hydrogen under 400 bar, 170° C. and for 48 hours.

The doped hydrogen storage material according to the invention may be used alone or in combination with other materials to store hydrogen, for instance in hydrogen storage tanks or hydrogen batteries.

EXAMPLES

The present invention is illustrated by the following non-limiting examples.

Sample Preparation

Thin film samples were prepared using a 'wedge' growth method as described in WO2005/035820.

Magnesium, boron and titanium comprising thin films were deposited on silicon wafers (ex. Nova Electronic Materials Ltd) in a custom built ultra high vacuum system ($1.3 \times 10^{-12}$ bar). The hydride samples were prepared in a background pressure of hydrogen (ex. AirProducts, N5.5 ($10^{-6}$ torr)). Magnesium (ex. Alfa Aesaer, 99.98%) was evaporated at 712K. Titanium (ex. Alfa Aesaer, 99.99%) was evaporated at 1832K. Both magnesium and titanium were evaporated from effusion cells (DCA). Boron (ex. Alfa Aesaer, 99.9%) was evaporated from an electron beam evaporator (Temescal single earth). Compositional analysis was carried out using inductively coupled plasma mass spectroscopy.

Example 1

Material Characterization

A sample having the general formula $Mg_{0.16}B_{0.81}Ti_{0.03}$ was analysed using X-ray Diffraction (XRD). $Mg(BH_4)_2$ has two crystalline structures the low temperature hexagonal structure and the high temperature orthorhombic structure. Transition of the hexagonal to the orthorhombic crystal structure takes place at 162° C. (435 K) (see J.-H. Her, et al., Acta Cryst. B63 (2007) 561-568). To investigate the crystallisation behaviour of the prepared doped hydrogen storage material according to the invention, two samples were prepared. The fist sample was annealed to a temperature of 150° C. (423 K) to induce formation of the hexagonal crystal structure. The second sample was annealed to 210° C. (483 K) to induce formation of the orthorhombic crystal structure. Both samples were analysed using XRD, Bruker D8 ($\lambda_{Cu}$ (1.541 nm)) integrated for 3600s using a general area detector (GADS) over an integration range of 16.7 to 49.1 two theta. The source arm was setup at 11° and the detector at 25°, giving a spot size of approximately 1 $mm^2$.

The samples were capped with an amorphous silicon dioxide film (ca. 100 nm) prior to XRD to prevent any oxidation.

For neither the low temperature or high temperature annealed samples were any XRD peaks identified in the XRD spectrum. This indicates that no detectable amounts of crystalline materials were formed and the prepared material was essentially amorphous.

In addition a sample having the general formula $Mg_{0.46}B_{0.81}Ti_{0.03}H_n$ was analysed as made. Also for this sample no XRD peaks were identified in the XRD spectrum. This indicates that no detectable amounts of crystalline materials were present and the prepared material was essentially amorphous.

Example 2

Dehydriding Measurements

Magnesium, boron, titanium thin films were deposited on arrays of micro electro mechanical (MEMS) devices to perform temperature desorption experiments from the thin film material libraries. Temperature programmed desorption was carried out at a rate of 23 $Ks^{-1}$ within a high vacuum chamber ($1.3 \times 10^{-12}$ bar). The hydrogen partial pressure was measured using a quadrupole mass spectrometer placed 20 mm from the sample.

The hydrogen desorption behaviour of samples representative for the doped hydrogen storage material according to the invention, i.e. $0.2<x<0.6$, $0.4<y<0.85$, $0.005<z<0.35$ and $0.15<x/y<1.5$, was determined using the above-described method.

Table 1 shows the hydrogen onset-temperatures for a number of Ti-doped hydrogen storage compositions. Chlopek et al. (J. Mater. Chem., 2007, 17, 3496-3503), have reported for $Mg(BH_4)_2$, that desorption commences at 290° C. All the doped hydrogen storage materials according to the present invention, show significantly lower hydrogen desorption onset temperatures.

TABLE 1

| Sample | Mg [x] | B [y] | Ti [z] | Mg:B [—] | Onset Temperature [° C.] |
|---|---|---|---|---|---|
| 1 | 0.342 | 0.598 | 0.060 | 0.57 | 243 |
| 2 | 0.345 | 0.595 | 0.060 | 0.58 | 216 |
| 3 | 0.352 | 0.588 | 0.060 | 0.60 | 205 |
| 4 | 0.302 | 0.672 | 0.026 | 0.45 | 186 |
| 5 | 0.372 | 0.602 | 0.026 | 0.62 | 212 |
| 6 | 0.336 | 0.616 | 0.048 | 0.55 | 207 |
| 7 | 0.354 | 0.598 | 0.048 | 0.59 | 210 |
| 8 | 0.289 | 0.662 | 0.049 | 0.44 | 187 |
| 9 | 0.285 | 0.613 | 0.102 | 0.46 | 219 |

In order to determine the optimum composition for a storage material the gravimetric capacity was considered in addition to the onset temperature. The obtained gravimetric capacity of a number of Ti-doped hydrogen storage compositions is given in table 2. The highest hydrogen storage capacity was obtained for a Ti-doped hydrogen storage material having a composition of $B_{0.58}Mg_{0.36}Ti_{0.06}$. This material showed a hydrogen desorption onset-temperature of 250° C., with a peak in the hydrogen desorption observed at 425° C. using a heating rate of 23 K/s.

TABLE 2

| Sample | Mg [x] | B [y] | Ti [z] | Hydrogen storage capacity [wt %] |
|---|---|---|---|---|
| 10 | 0.497 | 0.411 | 0.092 | 5.2 |
| 11 | 0.441 | 0.470 | 0.089 | 5.2 |
| 12 | 0.352 | 0.588 | 0.060 | 5.3 |
| 13 | 0.343 | 0.608 | 0.049 | 5.6 |
| 14 | 0.437 | 0.471 | 0.092 | 6.3 |
| 15 | 0.354 | 0.598 | 0.049 | 6.3 |
| 16 | 0.336 | 0.616 | 0.049 | 6.4 |
| 18 | 0.309 | 0.639 | 0.052 | 7.1 |
| 18 | 0.365 | 0.543 | 0.093 | 7.1 |
| 19 | 0.350 | 0.594 | 0.056 | 9.9 |
| 20 | 0.365 | 0.578 | 0.057 | 10.6 |

Example 3

Dehydriding and Rehydriding Experiments

A sample as characterised in Example 1 was hydrided until no further uptake of hydrogen was observed. The hydride sample was dehydrided in a second step by a temperature programmed desorption carried out at a rate of 23 $Ks^{-1}$ within a high vacuum chamber. The hydrogen partial pressure was measured using a quadrupole mass spectrometer placed 20 mm from the sample. Dehydriding was discontinued at a temperature of 595° C. and cooled to room temperature at a rate of 23 $Ks^{-1}$. At this stage the hydrogen storage material still comprised approximately 50 atomic % of the maximum amount of atomic hydrogen that could be stored. The maximum amount of atomic hydrogen was determined by thermal desorption analysis.

The obtained partially dehydrided sample was rehydrided in a third step by contacting the sample with hydrogen gas at a pressure of 10 bar for 8 hours under ambient temperature conditions (23° C.) No formation of $MgH_2$ was observed.

In a final step, the at least partially rehydrided sample obtained from the third step was again dehydrided following the same temperature program used for the initial sample to determine the amount of hydrogen which could be reversibly reabsorbed. It was observed the 23% of the amount of hydrogen desorbed in the second step from the initial sample was reversibly reabsorbed into the partially dehydrided doped hydrogen storage material. This shows that the doped hydrogen storage material according to the present invention can reversibly store hydrogen.

The invention claimed is:

1. A method for reversibly desorbing and/or absorbing hydrogen using a doped hydrogen storage material according to the general formula:

$$Mg_xB_yM_zH_n$$

wherein:
(i) the ratio of x/y is in the range of from 0.48 to 0.70, but outside the range of from 0.49 to 0.51;
(ii) z is in the range of from 0.005 to 0.35;
(iii) x+y+z equals 1;
(iv) M is at least one metal selected from the group consisting of Sc, Ti, V, Cr, Mn, Fe, Co, Ni, Cu and Zn;
(v) n is no more than 4y; and
wherein at least part of the doped hydrogen storage material is amorphous, the method comprising:
a) dehydriding the doped hydrogen storage material by desorbing hydrogen from the doped hydrogen storage material to obtain hydrogen gas and a partially dehydrided doped hydrogen storage material, whereby the obtained partially dehydrided doped hydrogen storage material comprises at least 30 atomic % of the maximum amount of atomic hydrogen which can be stored in the doped hydrogen storage material; and
b) hydriding the partially dehydrided doped hydrogen storage material by contacting the partially dehydrided doped hydrogen storage material with a hydrogen-comprising gas to reversibly store hydrogen and to obtain an at least partially rehydrided doped hydrogen storage material.

2. The method of claim 1, wherein at least 90% of the doped hydrogen storage material is amorphous.

3. The method of claim 1, wherein z is in the range of from 0.005 to 0.1.

4. The method of claim 1, wherein M is Ti and/or Ni.

5. The method of claim 1, wherein y is in the range of 0.5 to 0.85.

6. The method of claim 1, wherein the obtained partially dehydrided doped hydrogen storage material comprises at least 50 atomic % of the maximum amount of atomic hydrogen which can be stored in the doped hydrogen storage material.

7. The method of claim 1, wherein at least 95% of the doped hydrogen storage material is amorphous.

8. The method of claim 1, wherein z is in the range of from 0.02 to 0.07.

9. The method of claim 1, wherein M is Ti.

* * * * *